US 6,692,204 B1

(12) United States Patent
Ricard

(10) Patent No.: US 6,692,204 B1
(45) Date of Patent: Feb. 17, 2004

(54) CARGO ORGANIZER AND TRUCK LOADING AND UNLOADING ASSIST DEVICE

(76) Inventor: Robert E. Ricard, P.O. Box 560, Charlton, MA (US) 01507

( * ) Notice: Subject to any disclaimer, the term of this patent is extended or adjusted under 35 U.S.C. 154(b) by 0 days.

(21) Appl. No.: 10/262,842

(22) Filed: Oct. 3, 2002

(51) Int. Cl.⁷ .................................................. B60P 7/08
(52) U.S. Cl. ...................................... 410/121; 410/129
(58) Field of Search ............................... 410/121, 129, 410/140, 94; 224/42.34, 42.33, 403, 404; 220/552, 553

(56) References Cited

U.S. PATENT DOCUMENTS

| 4,236,854 A | * 12/1980 | Rogers ........................ 410/121 |
| 5,265,993 A | 11/1993 | Wayne ........................ 410/129 |
| 5,586,850 A | 12/1996 | Johnson ...................... 410/138 |
| 5,603,439 A | 2/1997 | Pineda |
| 5,697,742 A | 12/1997 | House ......................... 410/127 |
| 5,709,512 A | * 1/1998 | Smith ......................... 410/129 |
| 5,845,953 A | 12/1998 | Rusnock |
| 5,975,819 A | * 11/1999 | Cola .......................... 410/129 |
| 6,089,803 A | * 7/2000 | Holland ....................... 410/129 |
| 6,089,804 A | 7/2000 | Bartelt ........................ 410/140 |
| 6,158,761 A | * 12/2000 | King |
| 6,174,116 B1 | * 1/2001 | Brand ......................... 410/140 |
| 6,206,624 B1 | * 3/2001 | Brandenburg ............... 410/132 |
| 6,503,036 B1 | * 1/2003 | Bequette et al. ............. 410/94 |
| 6,511,272 B2 | * 1/2003 | Stafford ...................... 410/121 |
| 6,524,043 B2 | * 2/2003 | Earle et al. .................. 410/130 |

FOREIGN PATENT DOCUMENTS

CA 667558 * 7/1963 ............. 224/42.33

* cited by examiner

Primary Examiner—Stephen T. Gordon
(74) Attorney, Agent, or Firm—Richard C. Litman

(57) ABSTRACT

An easy access device to assist in loading and unloading cargo from the bed of a pick-up truck. The device includes two elongate side pieces, a head cross piece, and a lower adjustable cross piece. The device makes it unnecessary to get into and out of the bed of a pick-up truck to load or remove cargo. The device makes it easier to reach the cargo from the rear of the truck. The device has retractable handles to help move the cargo. Even if a bed cover is present, cargo is simply moved by the device into position to be loaded or unloaded. The device also divides the truck bed into compartments to allow orderly arrangement of cargo of various sizes.

11 Claims, 3 Drawing Sheets

CARGO ORGANIZER AND TRUCK LOADING AND UNLOADING ASSIST DEVICE

BACKGROUND OF THE INVENTION

1. Field of the Invention

The present invention relates to a space organizing and cargo holding device for the bed of a pickup truck, and more particularly, to a device that allows a user to load and removes cargo from a truck bed without requiring the user to climb onto the bed.

2. Description of the Related Art

Various devices have been created to aid in dividing and organizing the cargo in the bed of a pickup truck. Generally, however, these devices do not facilitate loading and unloading cargo placed on the truck bed.

U.S. Pat. No. 5,586,850, issued Dec. 24, 1996 to J. Johnson, discloses a panel for dividing the cargo bed into one or more areas adjustable in size. The panel is suspended from a track mounted on the body side rails.

U.S. Pat. No. 5,603,439, issued Feb. 18, 1997 to A. Pineda, discloses a truck cargo area organizer for carrying a multiplicity of small loads in an orderly fashion. The organizer has one fixed outer frame, and an inner drawer frame, the latter being capable of sliding within the outer frame.

Other patents relating to truck cargo area organizers include U.S. Pat. No. 5,265,993, issued Nov. 30, 1993 to M. Wayne (truck bed divider system for placement within bed of a truck); U.S. Pat. No. 5,697,742, issued Dec. 16, 1997 to T. House (an adjustable apparatus for dividing and stabilizing the cargo in the bed of a pickup truck); U.S. Pat. No. 5,845,953, issued Dec. 8, 1998 to D. Rusnock (a pickup truck bed divider); U.S. Pat. No. 6,089,804, issued Jul. 18, 2000 to Maynard W. Bartlett (a modular truck bed divider that form a set of compartment for cargo.

None of the above inventions and patents, taken either singularly or in combination, is seen to describe the instant invention as claimed. Thus an easy access device to load and unload pickup truck cargo solving the aforementioned problems is desired.

SUMMARY OF THE INVENTION

The present invention is a truck loading and unloading assist device made up of two parallel, side members and two cross members which extend between and connect the side members. The device is dimensioned to fit between the wheel wells in the bed of a pickup truck. Retractable handles attached at the end of each side member make it easy to grasp and slide the device and any cargo contained therein from the end of the bed toward the tailgate. Depending on how the device is turned in the truck bed, two or three sections can be created to aid in organizing and dividing cargo loaded onto the truck.

Accordingly, it is a principal object of the invention to provide a device which facilitates loading and unloading cargo on a bed of a pickup truck without requiring a user to climb onto the bed.

It is another object of the invention to provide a device which organizes and stabilizes cargo that is loaded onto the bed of pickup truck.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
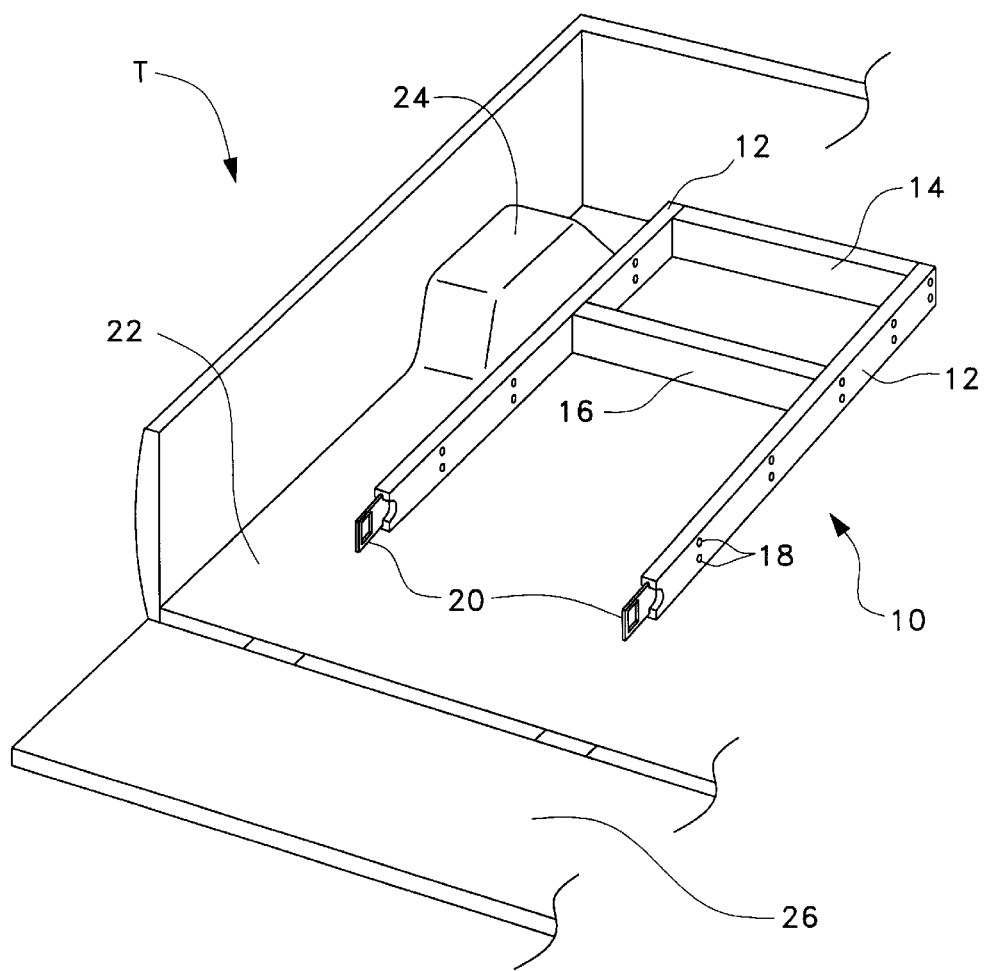
FIG. 1 is an environmental, perspective view of an easy access device that aids in loading cargo from the bed of a pickup truck according to the present invention.

As seen in FIG. 1 in use on the bed of a truck T, the present invention is a truck loading and unloading assist device 10 made up of two parallel, longitudinal side members 12, an upper cross-member 14, a lower cross-member 16, and two retractable handles 20 each extending from corresponding free ends of the longitudinal side members 20. Upper and lower cross-members 14 and 16 are positioned parallel to one another and extend between and connect longitudinal side members 12. The device 10 is dimensioned to fit easily between the wheel wells 24 of a truck bed 22.

While the length of the side members 12 may correspond substantially with the length of the truck bed 22, it is preferred that the side members 12 be at least fifteen (15) inches shorter than the length of the truck bed 22. In a preferred embodiment, then two side members 12, upper cross-member 14 and lower cross-member 16 are rectangular and fabricated from wood, and more preferably wooden two-by-fours. Aluminum, steel tubing or plastic can also be used to make these elements. If plastics are used, then handles 22 could be molded into place.

The upper cross member 14 is fastened to the side members 12 at its opposing ends. While any attachment fasteners (screws, pins, etc.) may be utilized, nuts and bolts are preferred. A plurality of adjustment holes 18 extend along the length of the side members 12 to receive the bolts (not shown). The bolts will attach to nuts (not shown) embedded at each end of the lower cross-member 16 and secure the cross-member 16 to the side members 12. The lower cross-member 16 can thus be adjusted along the two side pieces 12 using the adjustment holes 18 located on the two long side pieces 12 to create compartments of various sizes in the truck bed 22.

Figure 2:
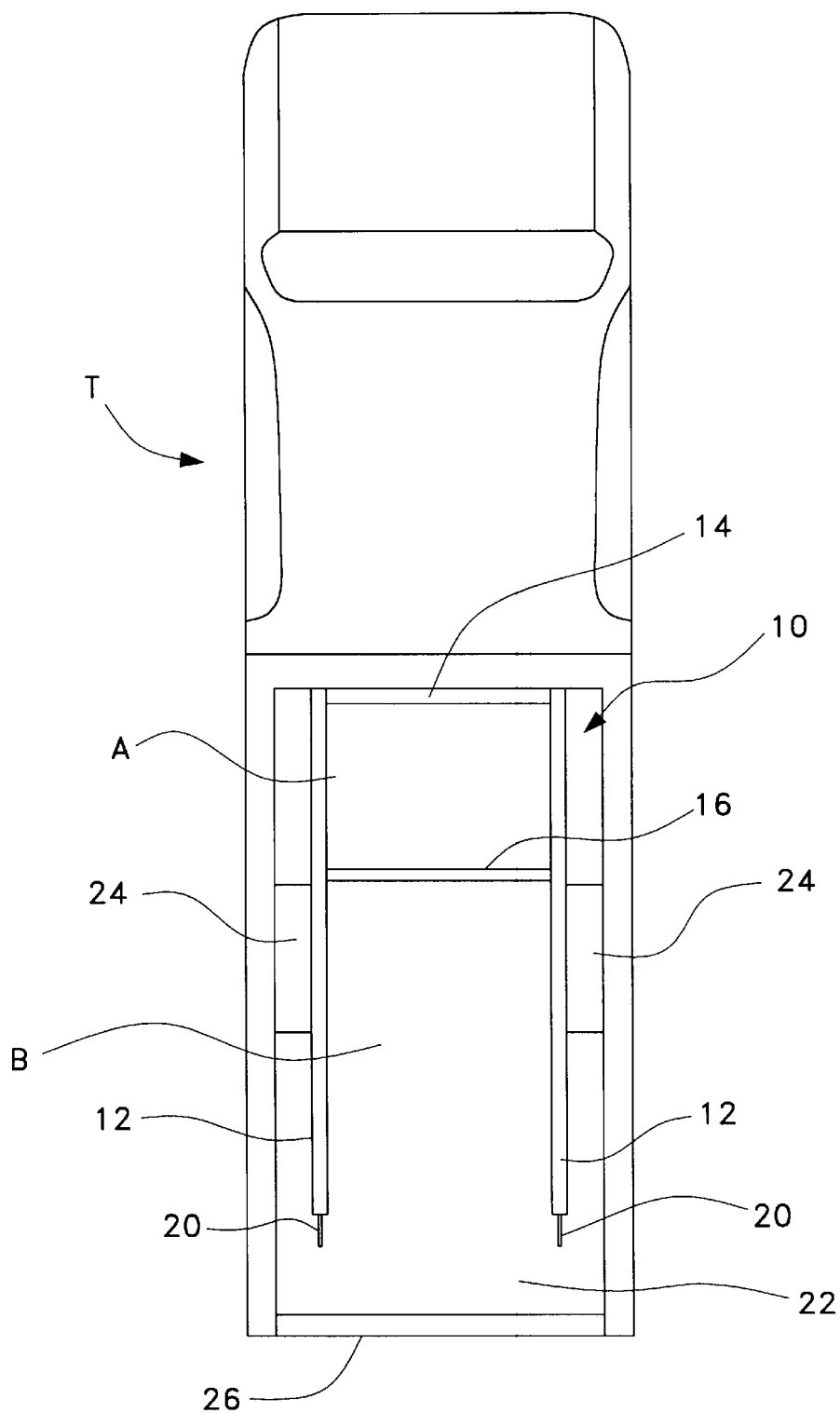
FIG. 2 is a top plan view of the invention in the bed of a pickup truck.

FIG. 2 shows the device 10 when the upper cross-member 14 is positioned away from the tailgate 26 of the truck T. In this position, the device 10 creates a first compartment A and a second compartment B. The first compartment A is between the upper cross member 14 and the lower cross member 16. Compartment B is located between the lower cross bar 14 and the tailgate 26 of the truck T. The first and second compartments A and B aid in keeping the cargo organized and in place during transport. The retractable handles 20 at one end of each side member 12 aid in sliding the device 10 along the truck bed 22 so that the cargo can be loaded or unloaded.

When the user wants to load the truck T, he or she simply grasps the handles 20 and pulls the device 10 towards the tailgate 26 of the truck T. The user can then load cargo in first compartment A, and push the device 10 back into position without having to climb onto the truck. Long or large cargo can then bell placed in the second compartment B. To unload, the user simply reverses the procedure. The truck T can be loaded and unloaded easily using the device 10 even if the truck bed 22 has a cover.

Figure 3:
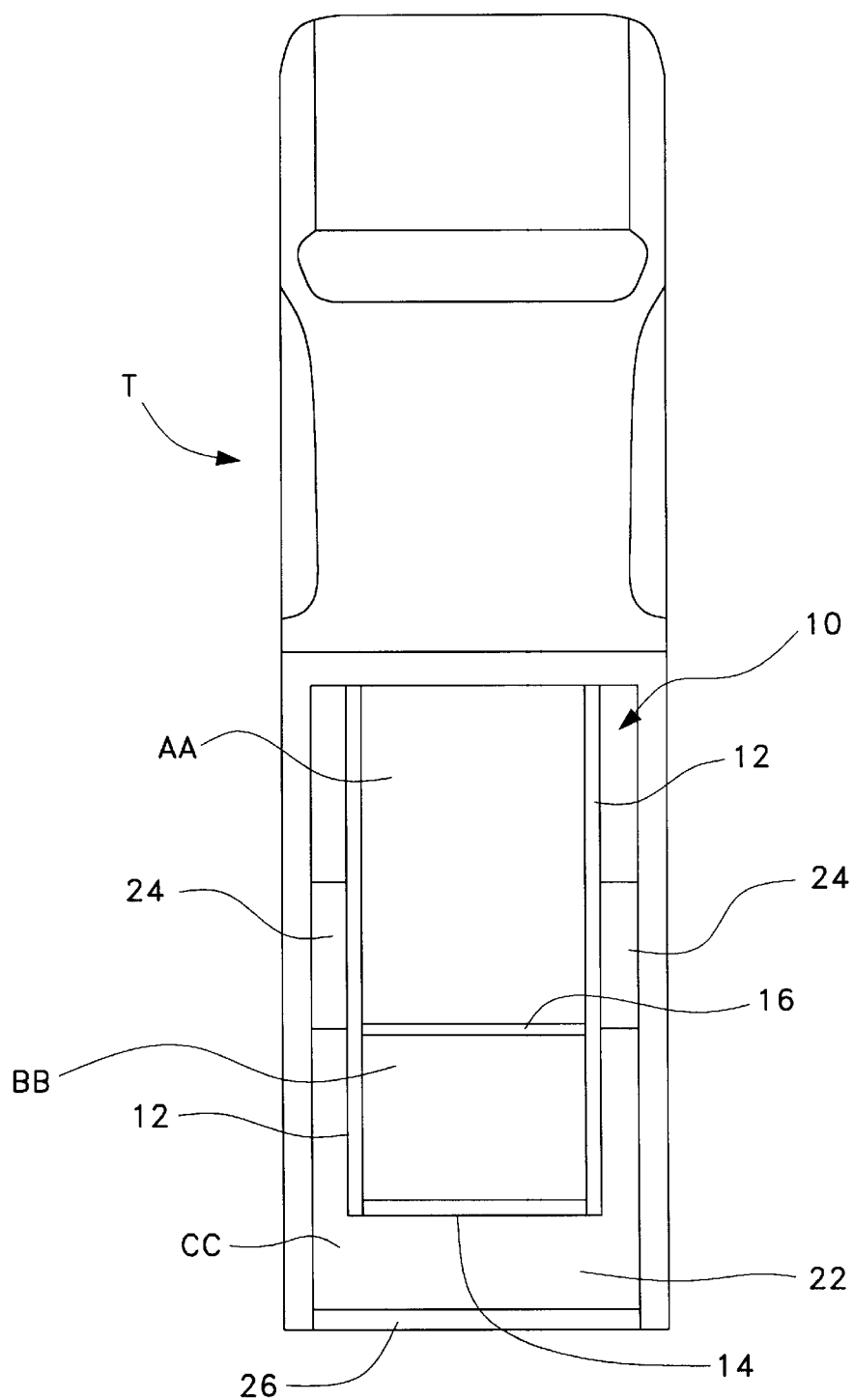
FIG. 3 is a top plan view of the invention in a reversed position in the bed of a pickup truck.

FIG. 3 shows the device 10 when the upper cross-member is positioned towards the tailgate 26 of the truck T. In this position, the device 10 creates a first compartment AA, a second compartment BB and a third compartment CC. The first compartment AA is between the lower cross-member 14 and the cab of the truck T. The second compartment BB is located between the upper cross-member 14 and the lower cross-member 16. The third compartment CC is located between the upper cross-member 16 and the tailgate 26 of the truck T. Cargo may be loaded and unloaded by pulling the upper cross-member 14 towards the tailgate 26. This position is ideal for smaller loads of cargo, such as grocery bags, boxes and the like as they can easily be loaded into the third compartment CC and the second compartment BB.

It is to be understood that the present invention is not limited to the embodiment described above, but encompasses any and all embodiments within the scope of the following claims.

I claim:

1. A truck loading and unloading assist device, comprising:
   two parallel, longitudinal side members, each having a free end;
   an upper cross-member extending between and connecting said side members;
   a lower cross-member extending between and adjustably fastened to said side members, said lower cross-member positioned parallel to said upper cross-member; and
   a pair of handles located at each said free end of said side members;
   wherein the device is positionable between the wheel wells in the bed of a pickup truck; and
   wherein the device can be slid along a surface of the truck bed to facilitate loading and unloading of cargo.

2. The truck loading and unloading assist device of claim 1, wherein, said pair of handles are retractable.

3. The truck loading and unloading assist device of claim 1, wherein said side members, said upper cross-member and said lower cross-member are constructed from wood.

4. The truck loading and unloading assist device of claim 1, wherein said side members are shorter in length than the a length of the truck bed.

5. The truck loading and unloading assist device of claim 1, including nut and bolt fasteners for securing said upper cross-member and said lower cross-member to said side members.

6. The truck loading and unloading assist device of claim 5, wherein said side members include a plurality of pairs of adjustment holes to facilitate adjusting the position of said lower cross-member.

7. A truck loading and unloading assist device, comprising:
   two parallel, longitudinal side members;
   an upper cross-member extending between and connecting said side members; and
   a lower cross-member extending between and adjustably fastened to said side members, said lower cross-member positioned parallel to said upper cross-member;
   wherein the device is dimensioned and configured to be positionable between the wheel wells in the bed of a pickup truck, and the device can be slid along a surface of the truck bed tog facilitate loading and unloading of cargo.

8. The truck loading and unloading assist device of claim 7, wherein said side members, said upper cross-member and said lower cross-member are constructed from wood.

9. The truck loading and unloading assist device of claim 7, wherein said side members are shorter in length than a length of the truck bed.

10. The truck loading and unloading assist device of claim 7, including nut and bolt fasteners for securing said upper cross-member and said lower cross-member to said side members.

11. The truck loading and unloading assist device of claim 7, wherein said side members include a plurality of pairs of adjustment holes to facilitate adjusting the position of said lower cross-member.

* * * * *